United States Patent
Van Vooren et al.

(10) Patent No.: US 10,023,133 B2
(45) Date of Patent: Jul. 17, 2018

(54) ON/OFF SWITCH ARRANGEMENT FOR A PIVOTABLE DISPLAY SCREEN IN A MOTOR VEHICLE

(71) Applicant: Panasonic Automotive Systems Company of America, Division of Panasonic Corporation of North America, Peachtree City, GA (US)

(72) Inventors: Gregory Paul Van Vooren, Peachtree City, GA (US); Michael Moore, Senoia, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/261,372

(22) Filed: Sep. 9, 2016

(65) Prior Publication Data

US 2017/0076886 A1     Mar. 16, 2017

Related U.S. Application Data

(60) Provisional application No. 62/219,456, filed on Sep. 16, 2015.

(51) Int. Cl.
| | |
|---|---|
| *H05K 7/00* | (2006.01) |
| *B60R 16/02* | (2006.01) |
| *H01H 19/36* | (2006.01) |
| *H01H 19/14* | (2006.01) |
| *H01H 3/16* | (2006.01) |
| *H01H 19/18* | (2006.01) |
| *H04N 1/00* | (2006.01) |

(52) U.S. Cl.
CPC .......... *B60R 16/0207* (2013.01); *B60R 16/02* (2013.01); *H01H 3/162* (2013.01); *H01H 19/14* (2013.01); *H01H 19/18* (2013.01); *H01H 19/36* (2013.01); *H04N 1/00* (2013.01)

(58) Field of Classification Search
CPC .... B60R 16/02; B60R 16/0207; H01H 19/18; H01H 3/162; H01H 19/36; H01H 19/14
See application file for complete search history.

(56) References Cited

U.S. PATENT DOCUMENTS

| | | | | |
|---|---|---|---|---|
| 4,883,284 A | * | 11/1989 | Nakazawa | B62H 1/02 180/219 |
| 2008/0000762 A1 | * | 1/2008 | Kurihara | B60K 37/06 200/293 |
| 2008/0115613 A1 | * | 5/2008 | Giefer | B60K 37/06 74/473.21 |

\* cited by examiner

*Primary Examiner* — James Wu
(74) *Attorney, Agent, or Firm* — Laurence S. Roach, Esq.

(57) ABSTRACT

An ON/OFF switch arrangement is for a display screen pivotably mounted within a motor vehicle. The arrangement includes a mounting bracket retaining the display screen and pivotably attached to the motor vehicle such that the mounting bracket may be pivoted about an axis. A switch assembly includes a rotor attached to the mounting bracket. A contactor is attached to the rotor. A base is attached to the motor vehicle such that the rotor and the contactor rotate about the axis relative to the base when the mounting bracket is pivoted. The base has two spaced apart electrical contacts. The contactor electrically interconnects the two contacts within a first range of rotational positions of the rotor, and the contactor does not interconnect the two contacts within a second range of rotational positions of the rotor.

20 Claims, 8 Drawing Sheets

ON/OFF SWITCH ARRANGEMENT FOR A PIVOTABLE DISPLAY SCREEN IN A MOTOR VEHICLE

CROSS-REFERENCE TO RELATED APPLICATION

This application claims benefit of U.S. Provisional Application No. 62/219,456 filed on Sep. 16, 2015, which the disclosure of which is hereby incorporated by reference in its entirety for all purposes.

FIELD OF THE INVENTION

The disclosure relates to a pivotable display screen in a motor vehicle, and, more particularly, to an ON/OFF switch for such a display screen.

BACKGROUND OF THE INVENTION

Motor vehicle infotainment systems sometimes include rear seat display screens or monitors that pivot between a stowed position and an in-service position wherein the screen is viewable. A switch may be provided that automatically turns on power to the monitor when the monitor pivots to the in-service position. A problem is that such switches are quite complicated and expensive.

One specific known apparatus includes a spring loaded plunger which is in contact with the inner garnish. As the screen is rotated, the plunger is pushed back to engage the first switch which activates the screen. As the screen is rotated further, the plunger is depressed more. Once the rotation angle is reached, the screen is shut OFF by activating a second switch.

SUMMARY

Disclosed herein is an arrangement including a rotatable switch for controlling the ON/OFF function of a pivotable display screen, wherein the switch may be mounted in direct attachment to the pivotable hinge shaft, thus greatly reducing the number of parts involved with the function. The rotor of the switch is driven by the bracket that retains the screen, and is attached to the same pivotable hinge shaft that locates the switch. The bridging contact of the switch may be attached to the rotor so that all parts are on the same concentric rotation axis, as all parts are located to the same mounting shaft. The base contains a circuit that the contact rotates relative to and bridges (interconnects) when the contact is positioned within a specified range of rotational angles, thereby causing a signal to be transmitted to the electronic control system to turn ON the screen. Similarly, the switch turns OFF the screen when the bridging contact is disposed at another range of specified rotational angles to thereby prevent the screen from being visible to the driver of the vehicle.

In one embodiment, the invention comprises an ON/OFF switch for a display screen mounted within a motor vehicle which turns the display screen ON or OFF based on the rotational position of the display screen relative to the body of the vehicle.

In another embodiment, the invention comprises a ON/OFF switch arrangement for a display screen pivotably mounted within a motor vehicle. The arrangement includes a mounting bracket retaining the display screen and pivotably attached to the motor vehicle such that the mounting bracket may be pivoted about an axis. A switch assembly includes a rotor attached to the mounting bracket. A contactor is attached to the rotor. A base is attached to the motor vehicle such that the rotor and the contactor rotate about the axis relative to the base when the mounting bracket is pivoted. The base has two spaced apart electrical contacts. The contactor electrically interconnects the two contacts within a first range of rotational positions of the rotor, and the contactor does not interconnect the two contacts within a second range of rotational positions of the rotor.

In yet another embodiment, the invention comprises an ON/OFF switch assembly for a display screen which is pivotably mounted within a motor vehicle. The assembly includes a rotor connected to the display screen such that the rotor pivots along with the display screen. An electrically conductive contactor is attached to the rotor. A base is rotatably coupled to the rotor. The base includes two spaced apart electrical contacts. The contactor engages each of the two contacts within a first range of rotational positions of the rotor relative to the base. The contactor does not engage each of the two contacts within a second range of rotational positions of the rotor relative to the base. The base is attached to the motor vehicle.

In still another embodiment, the invention comprises an ON/OFF switch arrangement for a display screen pivotably mounted within a motor vehicle. The arrangement includes a retaining device retaining the display screen such that the display screen is pivotable relative to the motor vehicle about an axis. A switch assembly includes a rotor attached to the retaining device or to the display screen. A base is attached to the motor vehicle such that the rotor rotates about the axis relative to the base when the display screen is pivoted. A contactor is attached to the rotor or to the base. Two spaced apart electrical contacts are attached to whichever of the rotor and the base that the contactor is not attached to. A level of electrical resistance between the two contacts is dependent upon a rotational position of the rotor relative to the base.

An advantage of the present invention is that it includes fewer parts than known arrangements, and thereby has better reliability, lower assembly costs, and lower material costs.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figures 1, 2:
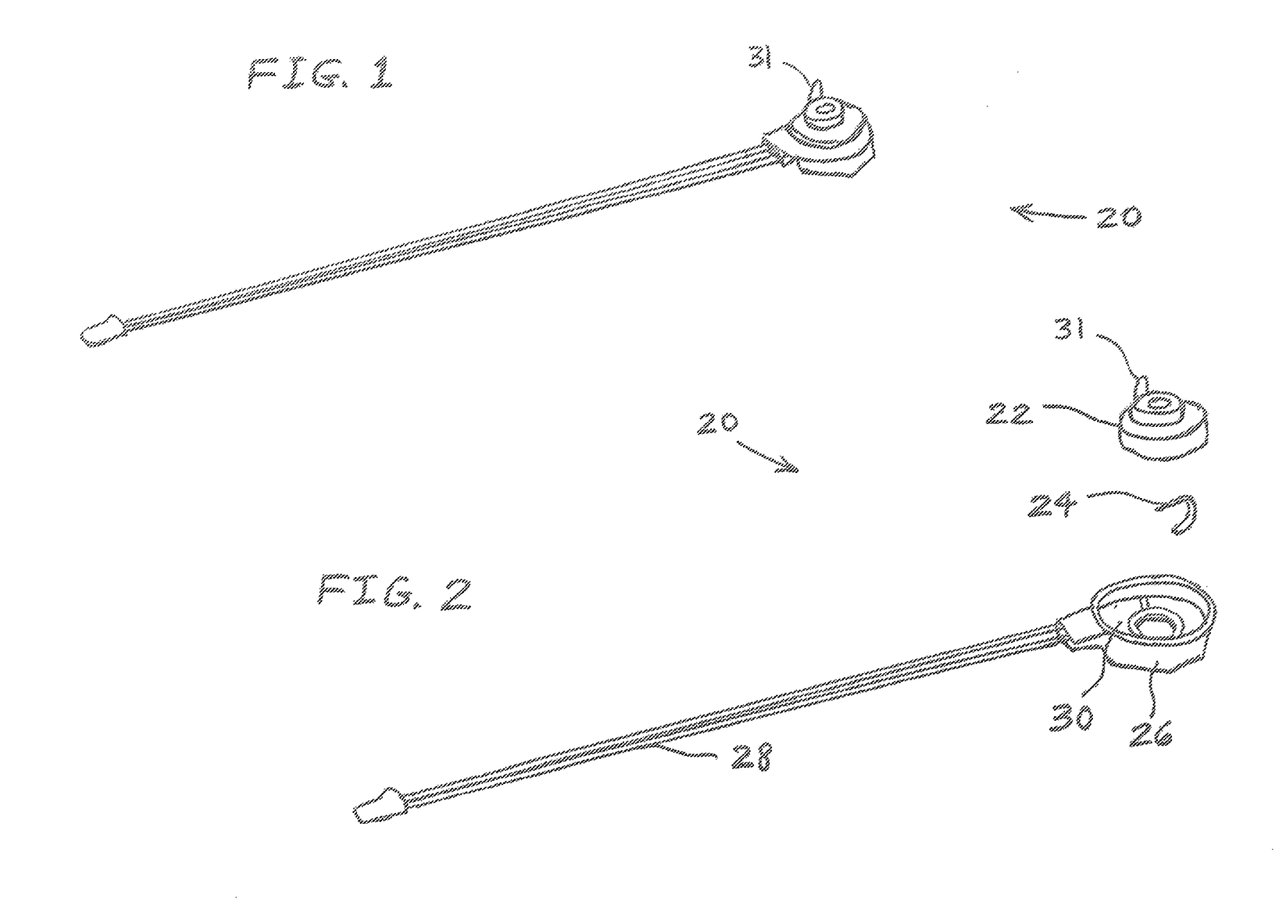
FIG. 1 is a perspective view of one example embodiment of a display screen ON/OFF switch assembly of the present invention.
FIG. 2 is an exploded, perspective view of the display screen ON/OFF switch assembly of FIG. 1.

FIG. 1 illustrates one embodiment of an ON/OFF switch assembly 20 of the present invention. ON/OFF switch assembly 20 may be used to turn a display screen ON in response to the screen being rotated from a stowed position to an in-use position, and may be used to turn the display screen OFF in response to the screen being rotated from the in-use position to the stowed position. The display screen may be pivotably mounted by a mounting bracket within the passenger compartment of a motor vehicle. For example, the display screen may be pivotably mounted to the back side of a front seat of a motor vehicle for use by rear seat passengers. Alternatively, the display screen may be pivotably mounted to the ceiling of a motor vehicle. As best shown in the exploded view of FIG. 2, ON/OFF switch assembly 20 includes a rotor 22, an electrically conductive, arcuate contactor 24, an insert molded base 26 and a harness assembly 28. Harness assembly 28 may be attached to a printed circuit board 30 of base 26 prior to base 26 being overmolded.

Rotor 22 includes a post 31 by which rotor 22 may be rotated. Post 31 may be parallel to, but offset from, the rotational axis of rotor 22.

Figures 3, 4:
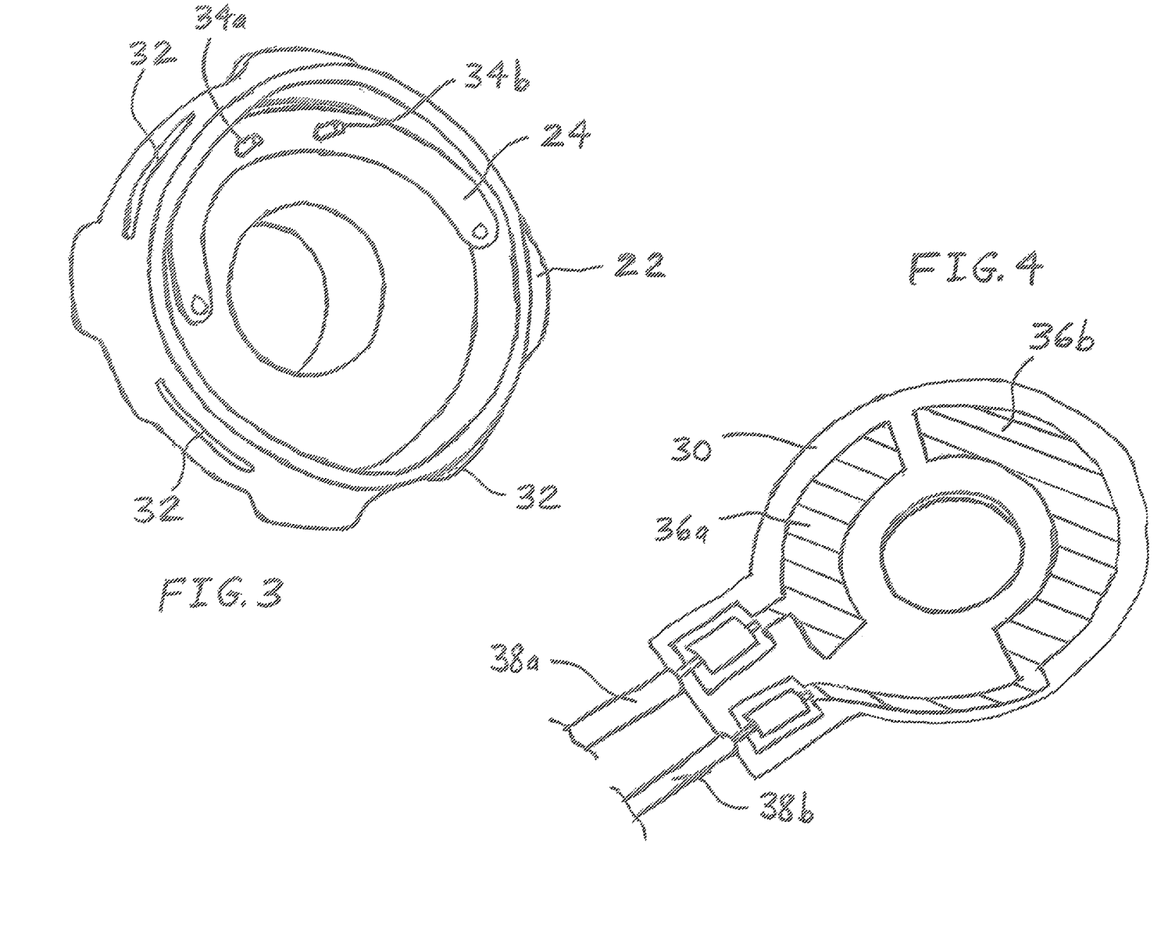
FIG. 3 is an enlarged perspective view of the rotor and contactor of the switch assembly of FIG. 1.
FIG. 4 is an enlarged perspective view of the circuit board of the base of the switch assembly of FIG. 1.

As shown in FIG. 3, the outer circumference of rotor 22 includes circumferentially oriented ribs 32 extending slightly in a radially outward direction. Ribs 32 may be received in circumferentially oriented grooves in an inner annular wall of base 26 to thereby retain rotor 22 and contactor 24 in engagement with base 26.

As shown at 34a-b, contactor 24 may be hot staked or cold staked to rotor 22 prior to rotor 22 being assembled to base 26.

Printed circuit board 30 of base 26 includes two electrical contacts 36a-b (FIG. 4) which are each connected to a respective one of wires 38a-b of wiring harness 28. Each of electrical contacts 36a-b has an arcuate shape. Wires 38a-b are crimped to printed circuit board 30 prior to this assembly being overmolded into base 26. The rotational angles of the display screen mounting bracket at which contactor 24 interconnects contacts 36a-b are dependent upon the circumferential spans of contactor 24 and contacts 36a-b.

Figure 5:
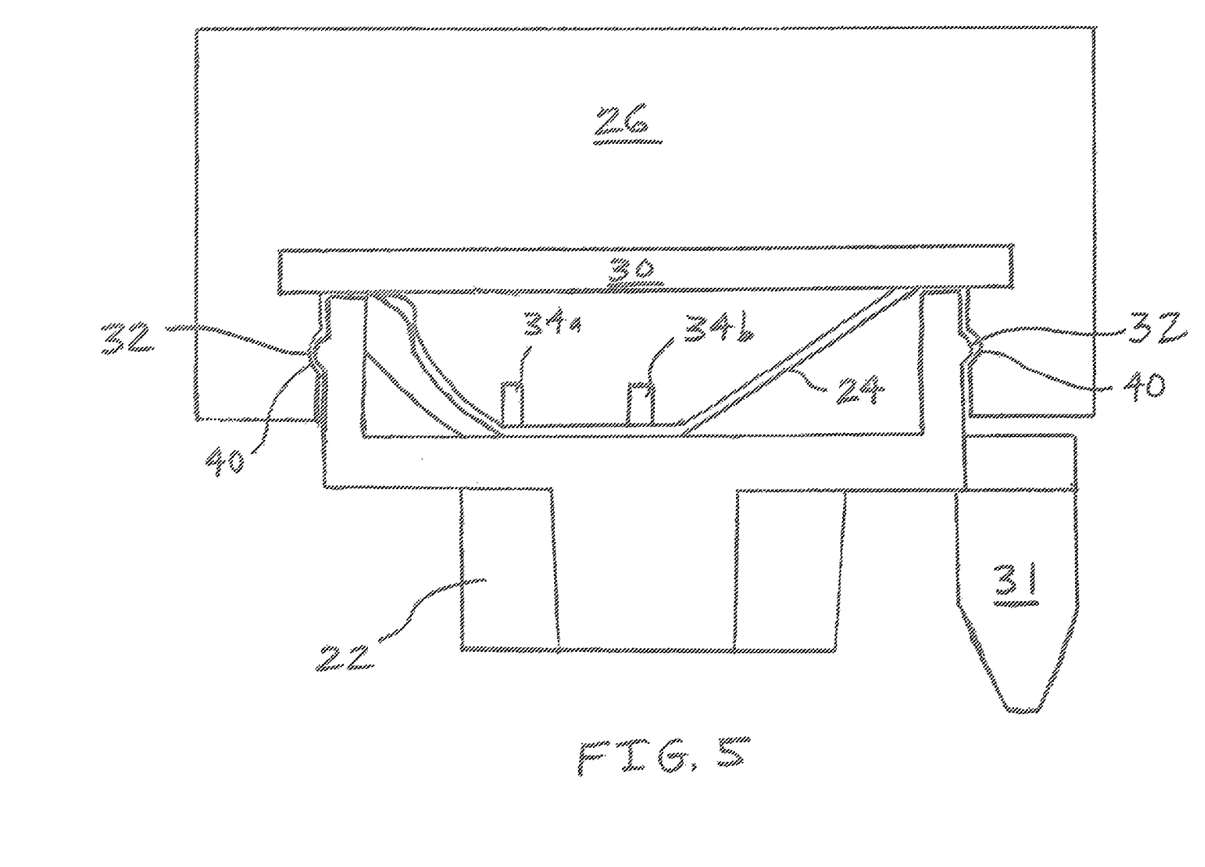
FIG. 5 is a cross-sectional view of the rotor and contactor coupled to the base of the switch assembly of FIG. 1.

As shown in FIG. 5, ribs 32 of rotor 22 are received in grooves 40 of base 26. This seating of ribs 32 within grooves 40 limits and controls the amount of deflection of contactor 24 and keeps rotor 22 biased or loaded against grooves 40.

Figure 6:
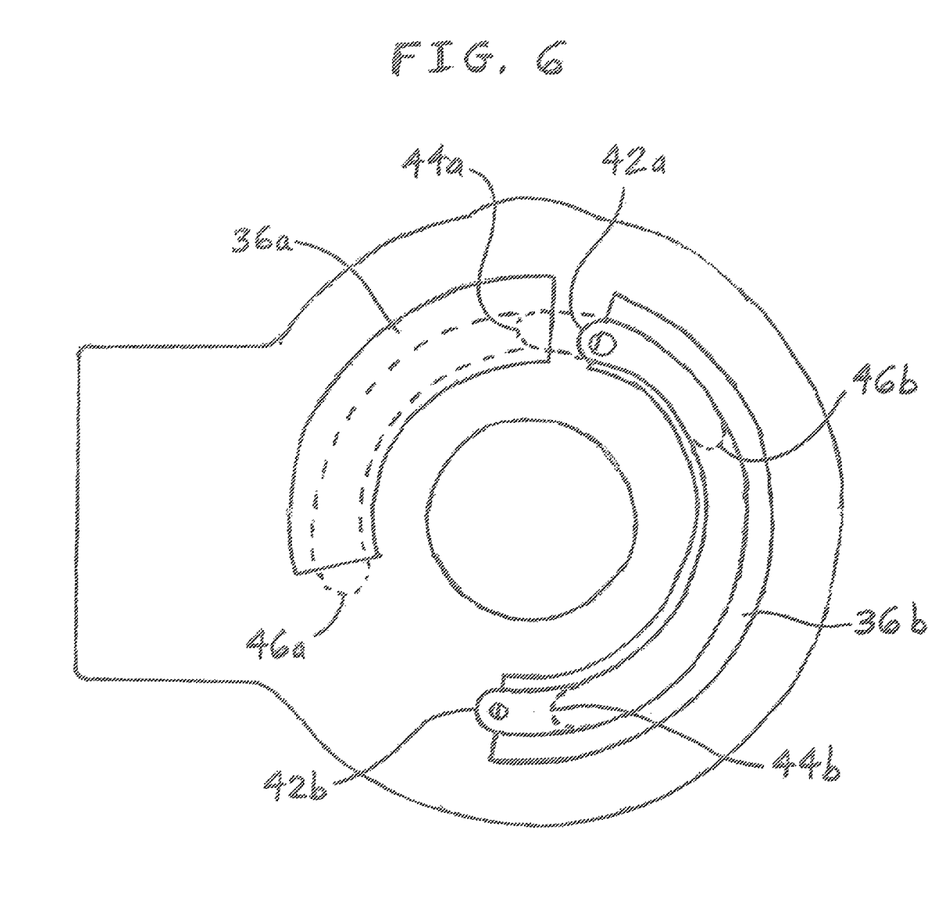
FIG. 6 is a schematic plan view of the contactor and the base of the switch assembly of FIG. 1.

FIG. 6 illustrates various rotational positions of contactor 24 relative to contacts 36a-b of printed circuit board 30. At a neutral (0 degrees of rotation) position, wherein the opposite ends of contactor 24 are at positions indicated at 42a-b, contactor 24 is electrically connected to contact 36b, but is not electrically connected to contact 36a. At a position of 15 degrees of rotation, wherein the opposite ends of contactor 24 are at positions indicated at 44a-b, contactor 24 is electrically connected to both contacts 36a-b. The electrical bridging of contacts 36a-b causes a signal to be transmitted to the control module that wiring harness 28 is connected to. The signal is indicative that the display screen should be activated. At a position of 125 degrees of rotation, wherein the opposite ends of contactor 24 are at positions indicated at 46a-b, contactor 24 is still electrically connected to contact 36b, but again is not electrically connected to contact 36a. Thus, the transmission of the signal ceases, and the display screen is again deactivated.

As described above, contactor 24 electrically connects contacts 36a-b when rotor 22 is in a first range of rotational positions between 15 degrees and 125 degrees of rotation; and contactor 24 does not electrically connect contacts 36a-b when rotor 22 is in a second range of rotational positions between 0 degrees and 15 degrees of rotation, or in a third range of rotational positions between 125 degrees of rotation and a maximum rotational position. The second range of rotational positions has no overlap with the third range of rotational positions. The first range of rotational positions, which has a span of about 110 degrees (125 degrees minus 15 degrees) is in-between the second range and the third range.

Figure 7A:
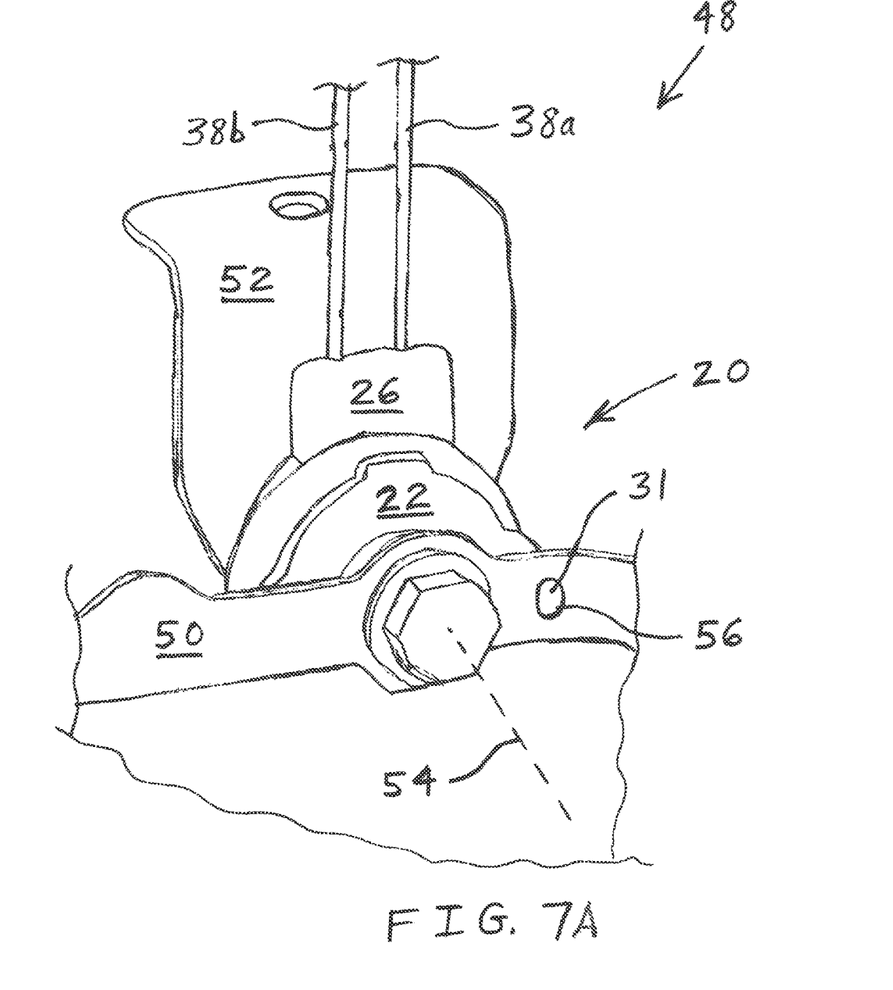
FIG. 7A is a fragmentary, perspective view of one example embodiment of an ON/OFF switch arrangement of the present invention including the display screen ON/OFF switch assembly of FIG. 1 in a first rotational position.
Figure 7B:
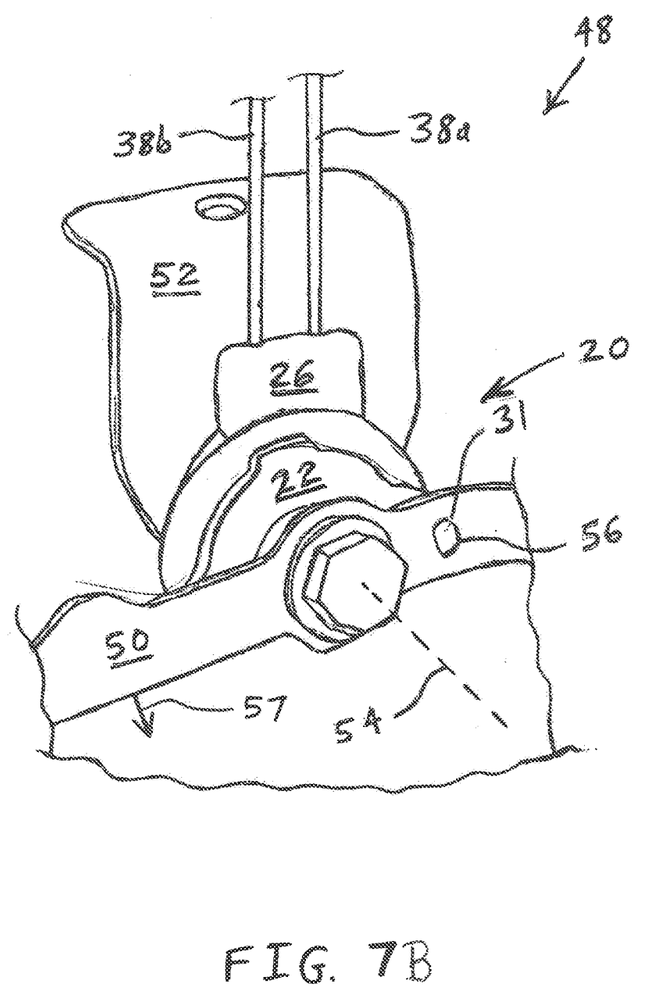
FIG. 7B is a fragmentary, perspective view of one example embodiment of an ON/OFF switch arrangement of the present invention including the display screen ON/OFF switch assembly of FIG. 1 in a second rotational position.

FIG. 7A illustrates one embodiment of an ON/OFF switch arrangement 48 of the present invention including display screen ON/OFF switch assembly 20, display screen mounting bracket 50, and vehicle mounting bracket 52. Display screen mounting bracket 50 retains a display screen (not shown) therein and is rotatable about axis 54 relative to vehicle mounting bracket 52. Vehicle mounting bracket 52 is attached to some surface within the passenger compartment of the vehicle, such as a ceiling or rear-facing surface of a front seat. Display screen mounting bracket 50 includes a recess or throughhole 56 that receives post 31 of rotor 22. Thus, rotor 22 and contactor 24 are attached to display screen mounting bracket 50 and rotate about axis 54 along with bracket 50. Base 26, however, is attached to vehicle mounting bracket 52 and does not rotate about axis 54. Display screen mounting bracket 50 is rotatably mounted, to the vehicle through vehicle mounting bracket 52. Display screen mounting bracket 50 rotates rotor 22 by a surface defining recess 56 exerting a force upon the post when bracket 50 is pivoted, FIG. 7B illustrates ON/OFF switch arrangement 48 in another rotational position, with rotor 22 and display screen mounting bracket 50 having rotated in direction 57 relative to base 26, vehicle mounting bracket 52 and the motor vehicle.

Figure 8:
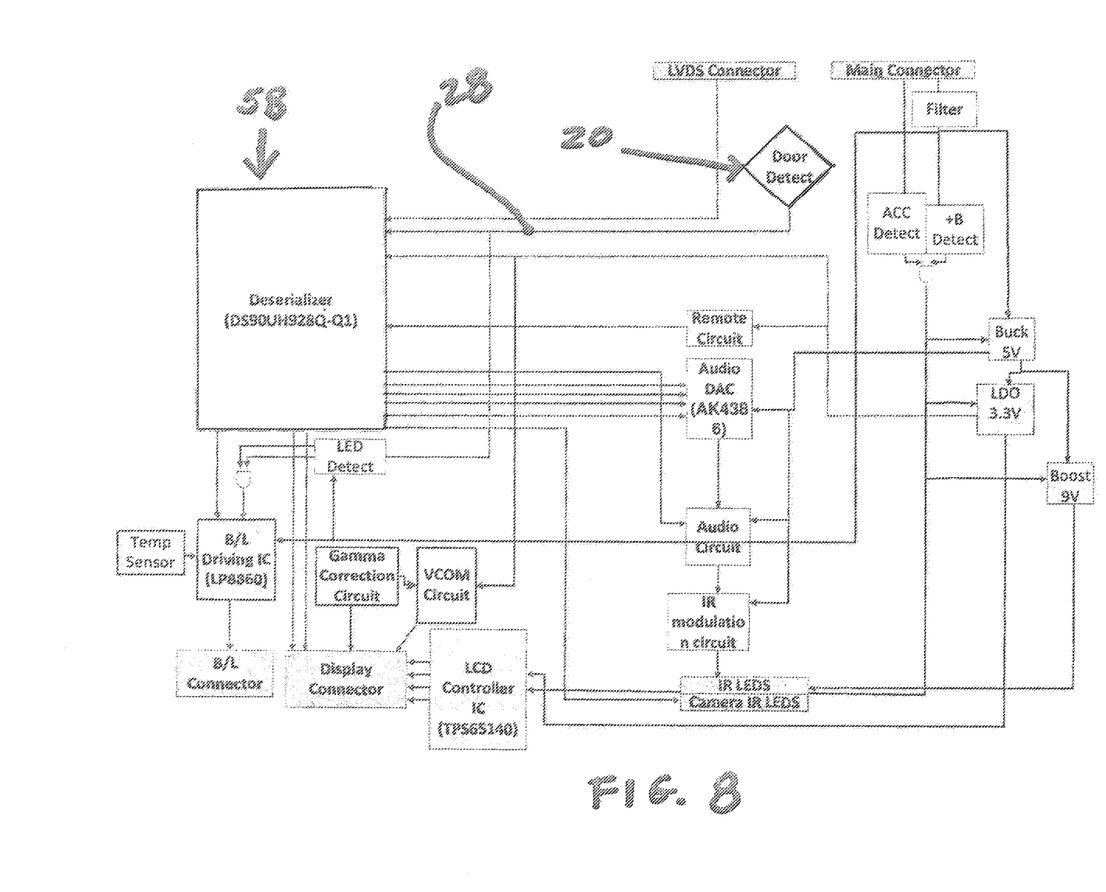
FIG. 8 is a block diagram of the electronic control system for the display screen, including the display screen ON/OFF switch assembly of FIG. 1.

FIG. 8 is a block diagram of the electronic control system for the display screen, including the display screen ON/OFF switch assembly 20. Switch assembly 20 is connected to display screen control module 58 via wiring harness 28. Based on signals module 58 receives from switch assembly 20, module 58 activates and deactivates the display screen.

Figure 9:
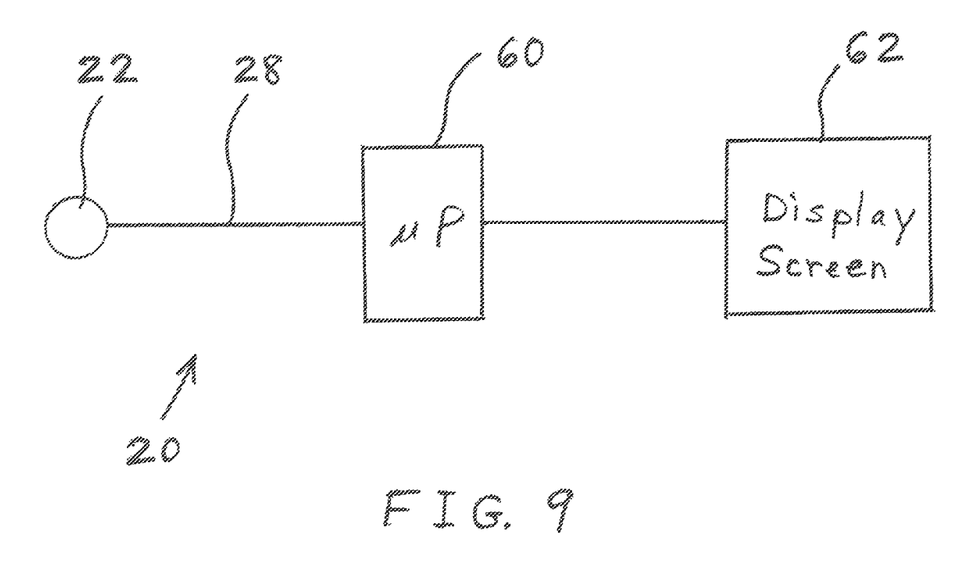
FIG. 9 is a simplified block diagram of another embodiment of an electronic control system, including the display screen ON/OFF switch assembly of FIG. 1.

FIG. 9 is a simplified block diagram of another embodiment of an electronic control system for a display screen, including the display screen ON/OFF switch assembly 20. Switch assembly 20 is connected to display screen control module 60 via wiring harness 28. Based on signals module 60 receives from switch assembly 20, module 60 turns ON and/or turns OFF a display screen 62. For example, when signals from switch assembly 20 indicate that display screen 62 is in a rotational position so as to be visible to a user, then module 60 may turn ON display screen 62. Conversely, when signals from switch assembly 20 indicate that display screen 62 is not in a rotational position so as to be visible to a user, then module 60 may turn OFF display screen 62.

Although, as described herein, the contactor is attached to the rotor and the contacts are attached to the base, in another embodiment of the invention the contactor is attached to the base and the contacts are attached to the rotor.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An ON/OFF switch arrangement for a display screen pivotably mounted within a motor vehicle, the arrangement comprising:
    a mounting bracket configured to retain the display screen and to be pivotably attached to the motor vehicle such that the mounting bracket may be pivoted about an axis; and
    a switch assembly including:
        a rotor attached to the mounting bracket;
        a contactor attached to the rotor; and
        a base attached to the motor vehicle such that the rotor and the contactor rotate about the axis relative to the base when the mounting bracket is pivoted, the base having two spaced apart electrical contacts, wherein the contactor electrically interconnects the two contacts within a first range of rotational positions of the rotor, and the contactor does not interconnect the two contacts within a second range of rotational positions of the rotor.

2. The arrangement of claim 1 further comprising a wiring harness including a first wire connected to a first of the two electrical contacts and a second wire connected to a second of the two contacts.

3. The arrangement of claim 2 further comprising a control module electrically connected to the wiring harness, the control module being configured to:
    enable an image to be displayed on the display screen in response to the contactor electrically interconnecting the two contacts; and
    inhibit the display screen from displaying an image, the control module being configured to inhibit the display screen in response to the contactor not electrically interconnecting the two contacts.

4. The arrangement of claim 1 wherein the contactor does not interconnect the two contacts within a third range of rotational positions of the rotor, the third range of rotational positions of the rotor having no overlap with the second range of rotational positions of the rotor.

5. The arrangement of claim 1 wherein each of the electrical contacts has an arcuate shape.

6. The arrangement of claim 1 wherein the rotor includes a post, and the mounting bracket includes a recess for receiving the post, the mounting bracket being configured to rotate the rotor by a surface defining the recess exerting a force upon the post.

7. The arrangement of claim 6 wherein the post is parallel to the axis.

8. An ON/OFF switch assembly for a display screen pivotably mounted within a motor vehicle, the assembly comprising:
    a rotor configured to be connected to the display screen such that the rotor pivots along with the display screen;
    an electrically conductive contactor attached to the rotor; and
    a base rotatably coupled to the rotor, the base including two spaced apart electrical contacts, wherein the contactor engages each of the two contacts within a first range of rotational positions of the rotor relative to the base, and the contactor does not engage each of the two electrical contacts within a second range of rotational positions of the rotor relative to the base, the base being configured to be attached to the motor vehicle.

9. The switch assembly of claim 8 wherein the contactor does not engage each of the two electrical contacts within a third range of rotational positions of the rotor relative to the base.

10. The switch assembly of claim 9 wherein the second range of rotational positions is in-between the first range of rotational positions and the third range of rotational positions.

11. The switch assembly of claim 8 wherein the contactor engages only one of the two contacts within the second range of rotational positions of the rotor relative to the base.

12. The switch assembly of claim 8 further comprising a wiring harness interconnecting the two contacts with a control module configured to activate and deactivate the display screen.

13. The switch assembly of claim 8 wherein the two electrical contacts are disposed on a circuit board within the base.

14. An ON/OFF switch arrangement for a display screen pivotably mounted within a motor vehicle, the arrangement comprising:
    a retaining device configured to retain the display screen such that the display screen is pivotable relative to the motor vehicle about an axis; and
    a switch assembly including:
        a rotor configured to be attached to the retaining device or to the display screen;
        a base attached to the motor vehicle such that the rotor rotates about the axis relative to the base when the display screen is pivoted;
        a contactor attached to the rotor or to the base; and
        two spaced apart electrical contacts attached to whichever of the rotor and the base that the contactor is not attached to, wherein a level of electrical resistance between the two electrical contacts is dependent upon a rotational position of the rotor relative to the base.

15. The arrangement of claim 14 wherein the two electrical contacts are electrically connected to each other within a first range of rotational positions of the rotor relative to the base, and the two electrical contacts are electrically disconnected from each other within a second range of rotational positions of the rotor relative to the base.

16. The arrangement of claim 15 wherein the second range of rotational positions of the rotor has a span of approximately between 80 degrees and 140 degrees.

17. The arrangement of claim 14 wherein the retaining device comprises a mounting bracket.

18. The arrangement of claim 14 wherein the base is attached to a ceiling of the vehicle or to a rear-facing surface of a front seat of the vehicle.

19. The arrangement of claim 14 further comprising a wiring harness connecting the two electrical contacts to a control module which is configured to activate and deactivate the display screen.

20. The arrangement of claim 14 wherein the contactor is arcuately-shaped.

* * * * *